United States Patent
Cullers et al.

(10) Patent No.: US 6,353,608 B1
(45) Date of Patent: Mar. 5, 2002

(54) HOST CONNECT GATEWAY FOR COMMUNICATIONS BETWEEN INTERACTIVE VOICE RESPONSE PLATFORMS AND CUSTOMER HOST COMPUTING APPLICATIONS

(75) Inventors: William R. Cullers; Greg L. Underhill, both of Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/098,371

(22) Filed: Jun. 16, 1998

(51) Int. Cl.[7] ............................................. H04L 12/66

(52) U.S. Cl. ........................................ 370/352; 370/401

(58) Field of Search ................................. 370/352–356, 370/401

(56) References Cited

U.S. PATENT DOCUMENTS

| | | | | |
|---|---|---|---|---|
| 5,247,664 A | * | 9/1993 | Thompson et al. | 395/600 |
| 5,859,972 A | * | 1/1999 | Subramaniam et al. | 395/200.33 |
| 5,884,312 A | * | 3/1999 | Dustan et al. | 707/10 |
| 6,208,345 B1 | * | 3/2001 | Sheard et al. | 345/356 |

* cited by examiner

Primary Examiner—Melvin Marcelo

(57) ABSTRACT

The present invention provides a customer host connect gateway that connects any Interactive Voice Response (IVR) platform with any customer host computer. The customer host connect gateway enables IVR applications to perform transactions with the customer host computer during the processing of a customer call in a call center. The customer host connect gateway satisfies all interoperability requirements, freeing IVR applications from the need for specifying any hardware or software information related to a host computer and from the need for providing a network address for the customer host computer. The customer host connect gateway includes a separate application for each customer host connection. The IVR platform issues a transaction to a customer host computer by sending a message to the customer host connect gateway. The customer-specific application on the host connect gateway then determines the format required for the customer host transaction, based upon the customer host computing platform an application. The customer host connect gateway also determines the particular connectivity protocols necessary for communicating with the customer host computer and the network address for the customer host computer. The customer host connect gateway also provides a user interface that allows new applications to be rapidly built and deployed on the host connect gateway.

60 Claims, 9 Drawing Sheets

Data Center Diagram

TAX SYSTEM — 601

Taxpayer ID: 111-22-3333 — 602
Tax Year: 1997 — 603
Tax Due: $5,000 — 604
Tax Paid: $5,000 — 605
Refund: 0 — 606
<MSG1449 = Payment Update> — 607

TAX SYSTEM — 601

Taxpayer ID: 111-22-3333 — 602
Tax Year: 1997 — 603
Tax Due: $5,000.00 — 604
Tax Paid: $4,000.00 — 605
Refund: −$1,000.00 — 606

TAX SYSTEM — 601

Taxpayer ID: 111-22-3333 — 602
Tax Year: 1997 — 603
Tax Due:
Tax Paid:
Refund:

FIG. 6A

HOST CONNECT GATEWAY FOR COMMUNICATIONS BETWEEN INTERACTIVE VOICE RESPONSE PLATFORMS AND CUSTOMER HOST COMPUTING APPLICATIONS

TECHNICAL FIELD

The present invention relates to computerized telephone call centers and in particular to a computerized gateway that interconnects call center interactive voice response platforms with customer host computing applications.

BACKGROUND OF THE INVENTION

A typical call center includes a number of agents who field inbound telephone calls and place outbound telephone calls. The agent may place outbound sales calls or field inbound calls (such as 800 numbers) from callers. A third party typically operates a call center for a customer. The customer may link certain skilled employees into the call center's communications channels as call center agents, in addition to other agents provided by the third party that operates the call center. Customers also frequently make their business record computing systems, or customer host computing systems, available to the call center and its agents as a means of expediting calls.

In a conventional call center, before a call reaches an agent, the call may first be directed into an interactive voice response (IVR) platform having an IVR application. Numerous types of IVR platforms and IVR applications are known in the prior art. The IVR application associated with the IVR platform queries the caller for information pertinent to the call. Information retrieved from the caller may be forwarded to the call center agent as an aid for expediting the caller's request, e.g., that the caller wishes to discuss an upcoming audit with a call center agent having tax auditing skills. Information retrieved from the caller may also be forwarded to the customer host computing system, and the reply received from the customer host computing system may be made available to the call center agent, e.g., the caller provides a taxpayer identification number, and the host computing system uses the taxpayer identification number to retrieve the caller's tax return for a previous year, and the IVR application forwards the tax return to a call center agent along with the call.

In some instances, the information retrieved from the host computing system by the IVR application may satisfactorily meet the customer's needs, and no action by a call center agent will be required, e.g., the customer provides a taxpayer identification number, and the host computing system responds with the date that the taxpayer's refind was mailed along with the refund amount. Thus, the IVR application efficiently responds to many customer requests without the necessity for intervention by an actual call center agent.

The IVR platform and the IVR application may execute a variety of specific applications for calls received in the call center. Third party telecommunications service providers typically offer a variety of network-based call center services to their customers. These services comprise a broad range of features for processing calls in the call center and for routing calls to one or more of the customer's own computing centers. Call centers having an IVR platform typically operate at lower cost than call centers staffed with agents performing tasks that could be performed by an IVR application communicating with a customer host computing system.

In a conventional IVR-configured call center, the IVR platform communicates with a customer host computing system through dedicated circuits or a router-based or a switch-based network that requires the IVR application to have knowledge of both the customer host computing system, including its software, hardware, and operating system, and the customer host computing system's network address. Because the IVR application must know so much information about the customer host computing system, deploying new applications requiring IVR platform-to-host computing system communications has been difficult. In addition to deploying new applications, these same difficulties have also arisen with mere updates to existing IVR platforms and customer host computing systems. Thus, in a conventional IVR-configured call center, connecting the customer host computing system to the IVR platform has been expensive and technically cumbersome.

FIG. 1 illustrates a prior art IVR-configured call center 112 implemented by the applicant for the Missouri Department of Revenue that overcomes some of the above limitations in an extremely limited context. The IVR-configured call center 112 has been designed to interface a specific type of IVR platform to a specific customer host computing system containing a specific application for handling the tax records of Missouri taxpayers. In the IVR-configured call center 112, an enhanced call router (ECR) 102 having an enhanced routing services (ERS) application 103 intercedes on behalf of call center agents 111 and receives calls from callers 100 via a public switched telephone network (PSTN) 101. The ECR 102 and the ERS 103 are a well known type of IVR platform and IVR application, respectively, and process calls received from callers in the manner described above.

While processing a call, the ERS 103 may require information stored in the customer's host computing system. In the specific prior art system shown in FIG. 1, the customer host computer is an IBM Multiple Virtual Storage (MVS) mainframe computer 109 containing a Missouri Department of Revenue tax application 110. Accordingly, the ERS 103 constructs a query for ultimate delivery to and processing by the Missouri Department of Revenue tax application 110.

As discussed above, in conventional IVR-configured call centers, the IVR application had to know how to format a query for the customer host computing system and the customer host application. However, in the IVR-configured call center 112, a host connect gateway 105 provides an interface between the ECR 102, a specific type of IVR, and the IBM MVS mainframe computer 109, a specific type of customer host computing system. The host connect gateway 105 provides an ECR front-end interface 106 that receives queries from the ERS 103 in an ERS-specific format via an Ethernet wide area network (WAN) 104. The ECR front-end interface 106 then provides each query to a Missouri Department of Revenue back-end interface 107 that formats the query for both the IBM MVS mainframe computer 109 and the Missouri Department of Revenue tax application 110 and sends the query over a token ring connection 108 to the IBM MVS mainframe computer 109.

The Missouri Department of Revenue tax application 110 processes the query and formats a reply. The IBM MVS mainframe computer 109 sends the reply over the token ring connection 108 to the Missouri Department of Revenue back-end interface 107. The Missouri Department of Revenue back-end interface 107 provides the reply to the ECR front-end interface 106. The ECR front-end interface 106 processes the reply into an ERS format. The ECR front-end interface 106 then sends the re-formatted reply to the ECR 102 over the Ethernet WAN 104.

The IVR-configured call center 112 overcomes the limitations discussed above only for connections between a specific IVR, the ECR 102, a specific IVR application, the ERS 103, a specific computing system, the IBM MVS mainframe computer 109, and a specific application, the Missouri Department of Revenue tax application 110. The IVR-configured call center 112 has not been designed to interface with computing systems other than the IBM MVS mainframe computer 109 or with applications other than the Missouri Department of Revenue tax application 110. The IVR-configured call center 112 also does not interface with IVRs other than the ECR 102 or with IVR applications other than the ERS 103. Moreover, the IVR-configured call center 112 has no facility for modifying either the Missouri Department of Revenue back-end interface 107 or the ECR front-end interface 106. The host connect gateway 105 has not been designed to connect multiple ECRs 102 with multiple IBM MVS mainframe computers 109, let alone to connect multiple IVR platforms with multiple customer host computing systems. In addition, the host connect gateway 105 cannot sustain a high throughput of queries and replies. In essence, the IVR-configured call center 112 provides only a slight improvement over conventional call centers in which the IVR application contains precise knowledge regarding the format required by the customer host computer and customer host computer application.

SUMMARY OF THE INVENTION

The invention provides a customer host connect gateway that interfaces any Intelligent Voice Response (IVR) platform with any customer host computing system. The customer host connect gateway enables an IVR application to perform transactions with a customer host computing application while processing a customer call in a call center. The customer host connect gateway satisfies all interoperability requirements, freeing IVR applications from any necessity for knowing specific hardware or software information related to a customer host computer, or a customer host computer application, and from the need for knowing the network address of the customer host computing system. The customer host connect gateway also interfaces multiple IVR platforms with multiple customer host computing systems in the same call center.

The customer host connect gateway includes a separate application for communicating with each customer host computing system. The IVR platform issues a transaction to a customer host computer by sending a message to the customer host connect gateway. A customer-specific application on the customer host connect gateway identifies the format required for the customer host transaction based upon the customer host computing system and the customer host computing application. The customer host connect gateway also determines the particular connectivity protocols necessary for communicating with the customer host computer and the network address for the customer host computing system. The customer host connect gateway additionally provides a user interface that facilitates the rapid building and testing of new applications for the customer host connect gateway.

BRIEF DESCRIPTION OF THE DRAWINGS

A preferred embodiment of the present invention will be described below relative to the following figures. Note that similar elements and steps in the figures have the same reference number.

FIGS. 6A, 6B, and 6C illustrate an exemplary set of interactions on terminal screens associated with a customer host computer application and a screen scraping application utilized in an embodiment of the invention.

DETAILED DESCRIPTION OF THE INVENTION

Figure 1:
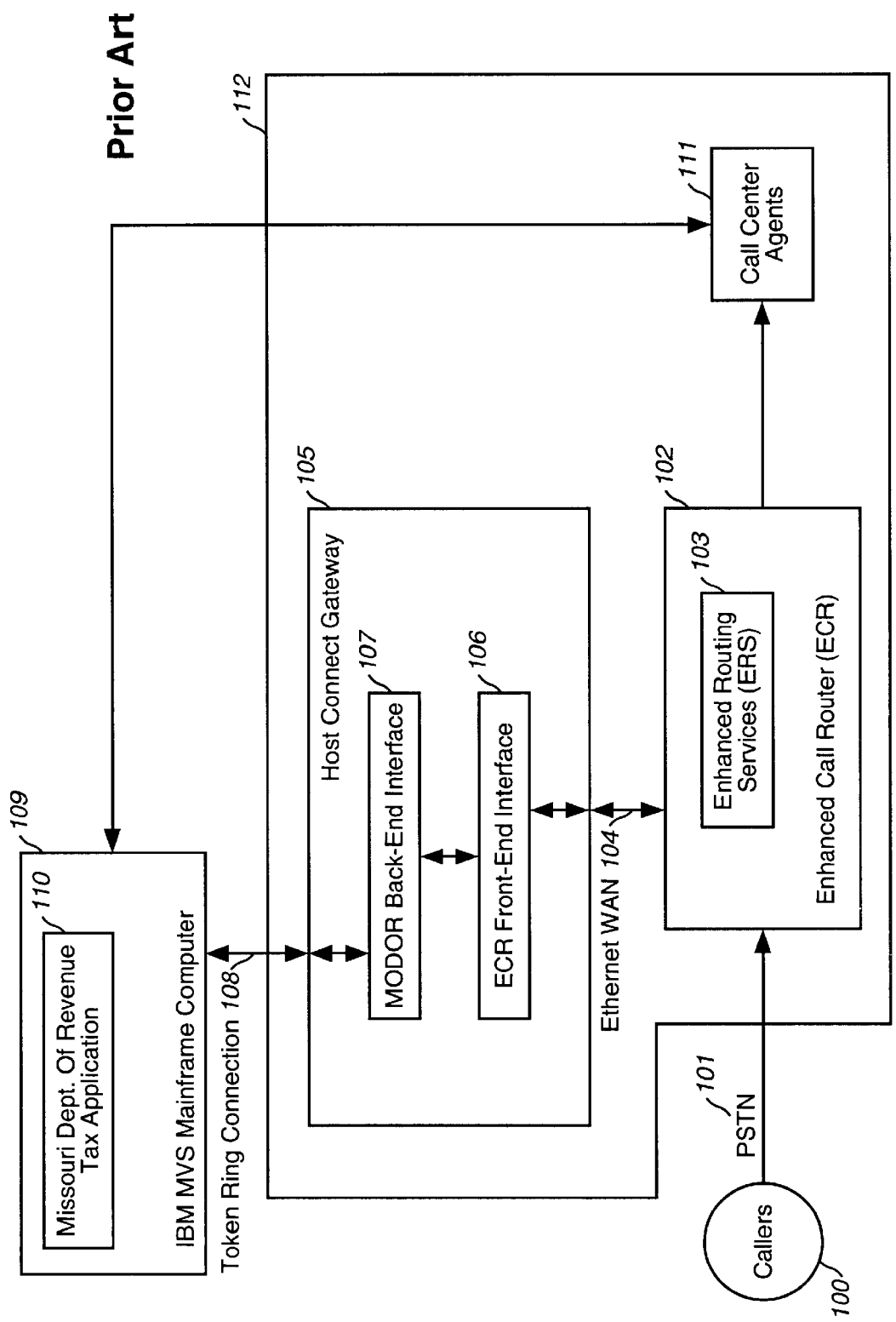
FIG. 1 illustrates a specific prior art IVR-configured call center that overcomes some limitations of conventional IVR-configured call centers in an extremely limited context.

The present invention provides a customer host connect gateway that provides a communications interface between an interactive voice response (IVR) platform and a customer host computing system. The customer host connect gateway enables IVR applications to perform transactions, such as queries and updates, with a customer host computer application during the processing of a call in a telephone call center. The customer host connect gateway satisfies all interoperability requirements between an IVR application and a customer host computer application, freeing the IVR application from any necessity for specifying hardware or software information pertaining to the customer host computing system or its network address. The customer host connect gateway provides a specific application, a host connect application, for each connection to a customer host computer and a customer host computer application. While processing a call in an IVR platform, an IVR application issues a transaction request to a customer host computer application by sending a generically formatted message to the customer host connect gateway, which is received within the gateway by the customer host computer application's specific host connect application. The host connect application determines the precise format required for transactions with the customer host computer application based upon the customer host computer and the customer host computer application. The host connect application also determines the appropriate communications protocol required for communications with the customer host computer and also identifies the network address for the customer host computer.

The host connect gateway frees IVR applications from having to know anything about customer host transaction formats and customer host computing systems. Accordingly, the IVR application only needs to prepare generically formatted messages, which are received by the host connect gateway for processing in the customer host computing system. The host connect gateway performs all functions necessary for interacting with the customer host computer, including receiving customer host computer application responses, translating responses to a message format recognized by the IVR application, and sending responses to the appropriate IVR application.

The simplicity of incorporating transactions with remote host computers into generically formatted messages sent by IVR applications can be readily appreciated. The IVR application requires no information regarding the host computer's operating system, its hardware platform, network addresses, or the input screen format. The host connect application provides all of these specifications. As previously discussed, IVR applications are extremely difficult to maintain. In conventional systems, even slight changes made to the host computer could require major modifications to the IVR application. Modifications to IVR applications require extensive testing and implementation procedures due to the extremely complex nature of IVR software and its uses in real-time, around-the-clock call processing. Using the customer host connect gateway, an IVR application does not require any modifications when the customer host computer or the customer host computer application changes. Modifications required of the customer host connect gateway due to changes in the customer host computer are considerably easier to perform and less risky in terms of overall system integrity. In addition, the customer host connect gateway also provides a user interface that enables rapid development and deployment of new host connect applications.

Figure 2:
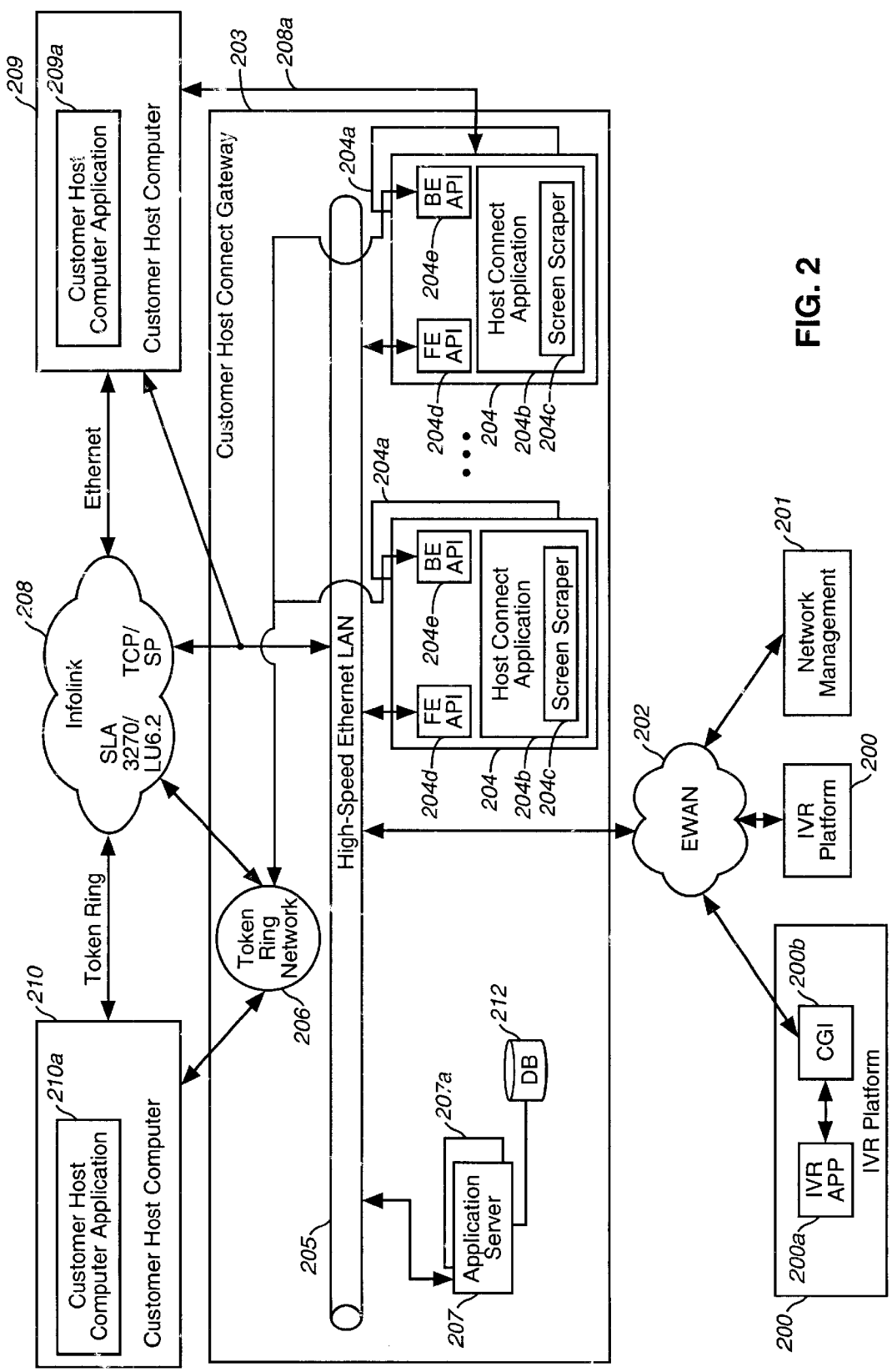
FIG. 2 illustrates the systems architecture for a customer host connect gateway, according to an embodiment of the invention.

FIG. 2 illustrates the systems architecture for a customer host connect gateway, according to an exemplary embodiment of the invention. A customer host connect gateway 203 comprises one or more host connect application servers 204 and an application server 207. The host connect application servers 204 and the application server 207 may communicate via different arrangements and in a preferred embodiment via a high speed Ethernet LAN 205.

The customer host connect gateway 203 may comprise two or more identical systems for redundancy and increased system integrity. As shown in FIG. 2, the customer host connect gateway 203 comprises a first server set, comprising the host connect application servers 204 and the application server 207, and a second server set, comprising host connect application servers 204a and an application server 207a. In this configuration, each of the identical customer host connect gateways serve all IVR platforms, such as an IVR platform 200. The customer host connect gateway 203 may communicate with more than one IVR platform 200 at a time, as shown in FIG. 2. In addition, the IVR platforms 200 may each be a different type of IVR platform, as the customer host connect gateway 203 may operate with all types of IVR platforms.

Each host connect application server 204 runs a customer-specific host connect application 204b. The host connect application servers 204 are Dec Prioris MX6200 Pentium-Pro processors, according to the preferred embodiment of the invention. The host connect application servers 204 utilize an operating system such as an IBM OS/2 or a Microsoft Windows NT, according to two embodiments of the invention. The preferred operating system is Microsoft's Windows NT.

Each host connect application server 204 includes a front-end application programming interface (API) 204d. The front-end API 204d provides a set of routines used by the host connect application 204b to direct the performance of procedures by the host connect application server's operating system. The host connect application server's front-end API interfaces with the IVR platform 200. A back-end API 204e on the host connect application server 204 interfaces with a customer host computer, such as customer host computers 209 and 210.

The front-end API 204d receives messages having a predetermined format from an IVR application 200a on the IVR platform 200. The front-end API 204d extracts a data field from these messages that reveals the native transmission request from the IVR application 200a, e.g., "retrieve tax records for taxpayer 446-61-9234 in 1997." The front-end API 204d communicates with the host connect application 204b. The IVR application 200a specifies a particular host connect application 204b in a destination application identifier field in the IVR platform's message. The destination application identifier refers to a specific host connect application 204b that has been built specifically for a particular customer host computer application, such as the customer host computer application 209a or 210a.

All front-end API 204d transactions are performed using a TCP/IP socket connection, according to one embodiment of the invention. TCP/IP provides a protocol for communications between computers that utilizes a procedure in which data messages are broken into packets for transmission and then reassembled and verified for completeness upon receipt. A socket provides an identifier for a particular network service on a particular node in a network. The socket comprises a node address and a port number that identifies the service. First, the IVR platform 200 establishes a socket connection with the customer host connect gateway's TCP/IP address. The IVR platform 200 sends the host connect request over the established socket connection. The IVR platform 200 starts a host connect response timer that measures the wait between the sending of the host connect request and a response from the customer host connect gateway 203. Upon receipt of the host connect response or expiration of the timer, the IVR platform 200 closes the socket connection.

The customer host connect gateway 203 starts a timer when it begins communicating with a back-end customer host computer, such as the customer host computer 209 or 210. If the timer expires, the customer host connect gateway 203 sends a host request time-out status message to the IVR platform 200. The host connect response time-out value in the IVR platform's timer should be greater than the customer host gateway timer's time-out value in order to ensure that the customer host connect gateway 203 may inform the front-end system, the IVR platform 200, that the IVR platform 200 knows when the customer host connect gateway 203 is functioning properly but has encountered a customer host computer time-out. If the host connect response timer in the IVR platform 200 expires before the customer host connect gateway's timer, then the IVR platform 200 will probably conclude that the front-end system, the customer host connect gateway 203, is not responding. Such an occurrence prompts the gateway socket connection to close before the host connect transaction has been completed and results in unnecessary exception processing throughout the entire system.

The customer host connect gateway 203 comprises a number of computing platforms having different TCP/IP addresses, such as the host connect application servers 204. The IVR application 200a determines the correct TCP/IP address to use when initiating a host connect transaction. The customer host connect gateway 203 performs a check to determine if the connection request arises from an authorized user. The customer host connect gateway 203 refuses to process unauthorized socket connection requests.

The IVR platform 200 connects to the customer host connect gateway 203 through an Ethernet wide area network (EWAN) 202. As discussed above, TCP/IP provides a communications protocol for communications between the customer host connect gateway 203 and the IVR platform 200, according to one embodiment of the invention. A common gateway interface (CGI) process 200b on the IVR platform 200 creates the TCP/IP messages that the IVR application 200a sends to the customer host connect gateway 203. When the IVR application 200a has formulated a query or other transaction for the customer host computer application, such as the customer host computer application 209a or 210a, the IVR application 200a prompts the CGI process 200b to determine which host connect application 204b and which host connect gateway server 204 should receive and process the transaction. The CGI process 200b then wraps the transaction in a message addressed to the IP address of the host connect application server 204 and sends the message over the EWAN 202.

Screen scraping software applications 204c operate with the back-end API 204e to formulate transmissions to the customer host computer applications, such as the customer host computer applications 209a and 210a. The screen scraping software application 204c includes an interactive service application development tool that provides access to data on nearly any type of computing system and may format data into virtually any standard format.

The screen scraping application 204c is particularly adept at retrieving data from screen based computing applications. For example, the screen scraping application 204c might emulate a user interacting with an IBM 3270 terminal screen in order to retrieve data from an IBM Multiple Virtual Storage (MVS) application. The screen scraping application 204c allows the host connect application 204b to perform transactions with the IBM MVS application, populating IBM 3270 terminal screens with data input, and then using the screen scraping application 204c to extract data from the IBM 3270 terminal screens. The screen scraping application 204c preferably locates an appropriate terminal screen then deposits and retrieves the requested data. The screen scraping application 204c may hold on to the screen for the duration of the session, although this is not required and is generally less efficient than simply retaining an ability to reposition to the screen quickly.

The screen scraping application 204c collects data from a customer host computer application, such as the customer host computer application 209a. The front-end API 204d and the host connect application 204b then re-format the data retrieved from the customer host computer application 209a or 210a into a format acceptable by an IVR application, such as the IVR application 200a. For example, the retrieved data may be re-formatted into a format resembling that of an HTML page if this is the format expected by the IVR application 200a.

The screen scraping application 204c supports interfaces to many types of networks, including IBM Systems Network Architecture (SNA), TCP/IP, and Novell Netware. The screen scraping application 204c also interfaces with different types of databases, such as Sybase, Oracle, Informix, and DB2 and may perform database queries such as those provided by the structured query language (SQL). The screen scraping application 204c also provides a standardized reporting function. An exemplary screen scraper application 204c suitable for use in an embodiment of the invention is the Electronic Workforce product from Edify.

Using the screen scraping application 204c together with the back-end API 204e, the customer host connect gateway 203 provides an interface for any type of customer host computer, such as the customer host computers 209 and 210, and any type of customer host computer applications, such as the customer host computer applications 209a and 210a. This interface frees the IVR application 200a from any necessity for knowing what type of computer has been used for the customer host computer 209 and how transactions with the customer host computer must be formatted. The IVR application 200a also has no need to know how to retrieve information from the customer host computer application 209a or 210a. Thus, the IVR application 200a may formulate a transaction using a generic format and merely provide this generic transaction message to the customer host connect gateway 203. The transaction message should identify the customer host computer application, such as the customer host computer application 210a, that should receive the information in the transaction message. The customer host connect gateway 203 then calls the appropriate customer host computer application 204b that provides the proper interface to the specified customer host computer application 209a or 210a.

The customer host connect gateway 203 also provides for the IVR application 200a the specific formatting required by the customer host computing application, such as the customer host computing application 209a or 210a. For example, if the customer host application 209a is accessed via IBM 3270 terminal screens, the host connect application 204b and its associated screen scraping application 204c know which fields in the IBM 3270 terminal screen must receive data and which fields contain the resulting data. Accordingly, the IVR application 200a simply provides a generically formatted message comprising the data to be entered into the customer host computer application 209a or 210a. If the terminal screens on the customer host computer application 209a change, then only the host connect application 204b needs to be modified. As previously noted, modifying the host connect application 204b is considerably easier and considerably less expensive than modifying the IVR application 200a.

Each host connect application server 204 maintains a read/write capability to a customer host computer, such as the customer host computers 209 and 210. However, the host connect application server 204 does not directly perform these read/write operations on a customer host computer, but instead the host connect application server 204 sends requests to the customer host computer 209 or 210, with the customer host computer application 209a or 210a actually performing any read/write operations. The customer host computer application 209a or 210a then returns any responses to the host connect application server 204 for translation into a format suitable for a response message to the IVR application 200a. The host connect application 204b performs any necessary editing of a response in order to place the response into an appropriate response message format for the IVR application 200a, and then sends the response message to the IVR application 200a.

The host connect application servers 204 generate messages pertaining to both performance statistics and alarms. The host connect application servers 204 then forward these messages to the application server 207. The application server 207 records these messages in a systems log in a database 212. The system log is useful for network management and performance monitoring. In a preferred embodiment of the invention, the application server 207 is a Dec Prioris MX6200 Pentium Pro Processor running on an IBM OS/2 or an a Microsoft Windows NT operating system. The preferred operating system is the Windows NT operating system. In a preferred embodiment of the invention, the database 212 is an Oracle database.

According to another embodiment of the invention, each host connect application server 204 has an Oracle database client that writes alarms and statistics produced by the Edify Electronic Workforce application to an Oracle database on the application server 207. The host connect gateway 203 provides alarms to a network management system 201. The application server 207 receives these alarm reports from each host connect application server 204, or from an a program operating on the host connect application server 204 such as the screen scraping application 204c. A remote network management system 201 may retrieve the alarm reports from the application server 207 over the EWAN 202.

The customer host computer, such as the customer host computer 209 or the customer host computer system 210, encompasses any number of computing systems. For example, the host computing system 210 may be an IBM MVS mainframe computer operating over a token ring network, and the customer host computer 209 may be a computing system utilizing TCP/IP over an Ethernet connection. In particular, the customer host computer 210 may be accessed by the customer host connect gateway 203 via a Systems Network Architecture (SNA) network utilizing a token ring connection. Token ring connectivity is typically required for such SNA connections.

The customer host connect gateway 203 may communicate with the customer host computers 209 or 210 either directly or using Infolink 208. Infolink 208 is an internal Internet Protocol (IP) network provided by MCI that interfaces with a variety of communications channels, including token ring networks and Ethernet networks. The customer host connect gateway 203 may establish a direct connection 208a between a customer host computer, such as the customer host computer 209, and the host connect application servers 204 and 204a. The direct connection 208a may provide a Synchronous Data Link Control (SDLC) protocol connection such as that used by networks conforming to the Systems Network Architecture (SNA). A customer host computer, such as the customer host computers 209 and 210, may connect to the customer host connect gateway 203 using a frame relay access to the Infolink 208 or via dedicated 56 Kbps line to the host connect application servers 204, according to two exemplary embodiments of the invention.

Host connect applications 204b for the customer host connect gateway 203 may be built and tested on remote computing platforms. The screen scraping software 204c provides additional software for building host connect applications. The host connect applications 204b may then be deployed to the customer host connect gateway 203 through the file transfer protocol (FTP). According to the preferred embodiment of the invention, remote computing systems send to a centralized application distributor new customer host connect applications 204b in order to ensure data integrity among the plurality of distributed host connection gateway application servers 204.

The following provides an example of the customer host connect gateway 203 in operation. A call arrives at the IVR platform 200. The IVR platform 200 executes an associated IVR application 200a, selected from other IVR applications based on criteria such as the number dialed for the call. The IVR application 200a eventually reaches a point in processing the call when customer host data is required. The IVR application 200a specifies the input required for the transaction, e.g., "taxpayer identification equals 446-34-0923." In many instances this input may be collected from the caller. The customer host transaction may be a data query, an update, an addition or a deletion, for example. The IVR application 200a then creates a message having a standardized, or generic format. This generically formatted message identifies the IVR application 200a as a source application and the IVR application's IP address as a source address. The message identifies the host connection gateway application 204b as a destination application and the host connect gateway server's IP address as a destination address. The IVR application's transaction is included in a variable length data field in this message. The IVR platform 200 then sends this message to the host connect gateway 203 via TCP/IP over the EWAN 202.

The destination host gateway server 204 receives the message. The front-end API 204d extracts the IVR application's transaction request from a data field in the message and selects the host connect application 204b that is referenced in a destination application field in the message before transmitting the extracted message to the appropriate host connect application 204b. The host connect application 204b identifies the customer host computer for which the transaction is intended. The host connect application 204b, in conjunction with the screen scraping application 204c, creates a transaction-specific message for the appropriate customer host computer application, such as the customer host computer applications 209a and 210a. The host connect application 204b, in connection with the back-end API 204e, wraps the transaction-specific message in an appropriate format for the particular type of host computer and network used for connectivity, such as the customer host computer 209 and the Ethernet 205, respectively. The host connect gateway 203 then sends the message to the customer host computer, such as the customer host computer 209, via an appropriate communications link, such as the token ring 206, the Ethernet 205, or the Infolink network 208.

The customer host computer application, such as the customer host computer application 210a, processes the transaction and returns a response to the host connect gateway server 204. In the response received by the host connect gateway server 204, the identifiers for the IVR application 200a and the IP addresses remain intact so that the host connect gateway server 204 knows where to return the response message. The host connect application 204b and the front-end API 204d translate the response into a format suitable for the IVR application 200a and send the response in a message addressed to the IVR platform 200 and IVR application 200a.

Exemplary applications utilizing an embodiment of the invention include an application that allows taxpayers to call a toll-free number, access an IVR application and request an extension to their tax filing deadline. A second exemplary application allows taxpayers to file their state income taxes over the telephone using Dual Tone Multi-Frequency (DTMF) signaling for input. In both of these exemplary applications, only a single IVR platform is required. A single toll free number is called, and a single IVR application is executed.

While connected with the IVR application, the caller is provided with options for either requesting an extension or for filing taxes using the tax filing system. Both of these applications involve transactions with an IBM MVS mainframe computer. These transactions are processed by two different host connect applications 204b in a host connect gateway, such as the host connect gateway 203 shown in FIG. 2. The IVR application 200a may eventually reach a point in its transaction with the caller when interaction in required with the IBM MVS mainframe computer, connected with the host connect gateway 203 in the manner shown in FIG. 2. The IVR application 200a creates a message that references the appropriate host connect application. A message is then sent to the host connect gateway server, such as the host connect application server 204, which calls the referenced host connect application, such as the host connect application 204b.

For the extension request service, a caller enters his taxpayer identification in order to request an extension to his filing deadline. The IVR application includes the date, time and taxpayer identification in the data field of a message to the host connect gateway 203. The host connect application extracts this data field and logs on to the host IBM MVS mainframe computer which contains a tax records programming application that utilizes IBM 3270 terminal screens. The screen scraping application 204c associated with the host connect application 204b then enters the taxpayer identification, date and time in the appropriate fields on the host computer's IBM 3270 terminal screen. The host IBM MVS mainframe computer then processes the request and provides a confirmation number. The screen scraping application associated with host connect application collects the confirmation number via IBM 3270 terminal screen emulation. The host connect application 204b encapsulates the confirmation number in a message formatted for the IVR application 200a and sends the message to the IVR application 200a. The IVR application 200a receives the response message with the confirmation number and provides this number to the caller via voice response. As previously discussed, 3270 terminal emulation and screen scraping are capabilities built into the Edify Electronic Workforce product.

Figure 3:
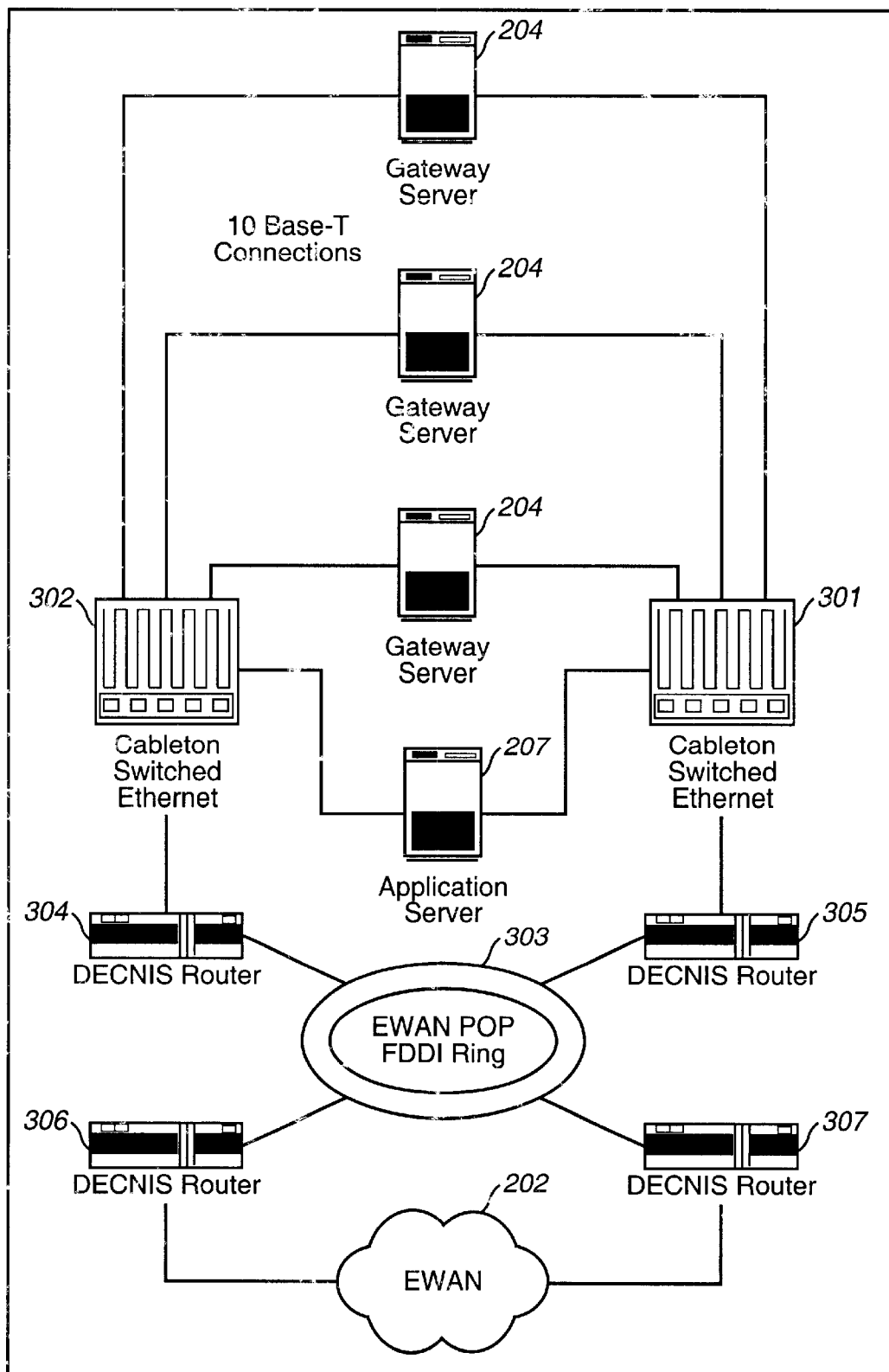
FIG. 3 depicts an exemplary physical architecture for a host connect gateway site, such as the customer host connect gateway 203 shown in FIG. 2.

FIG. 3 provides an exemplary physical architecture for a host connect gateway site, such as the customer host connect gateway 203 shown in FIG. 2. As shown in FIG. 3, host connect application servers 204 and the application server 207 are connected to dual Ethernet switches 301 and 302. As previously mentioned, in one embodiment of the invention, the customer host connect gateway 203 has redundant elements, and the dual Ethernet switches 301 and 302 are redundant exemplars of the high speed Ethernet LAN 205 shown in FIG. 2. The Ethernet switches 301 and 302 are connected to an FDDI ring 303 via DECNIS routers 304 and 305. The Fiber Distributed Data Interface (FDDI) is a standard for high speed fiber optic local area networks (LANs). The FDDI ring 303 and DECNIS routers 306 and 307 provide the customer host connect gateway 203 site with connectivity to the EWAN 202. The Ethernet switches 301 and 302 are connected to two of the gateway servers 204 using a ten base-T connection. Ten base-T refers to the physical layer cable connectivity of a gateway server computer to an Ethernet switch, such as might exist between the host connect application servers 204 and the Ethernet switch 301. Ten base-T provides an Ethernet LAN that works on a twisted pair wiring that somewhat resembles telephone cabling. Using a Ten base-T connection provides an advantage in that if one of the host connect application servers 204 becomes inoperable or crashes, then this computer's demise will not bring down the entire customer host getaway 203.

Figure 4:
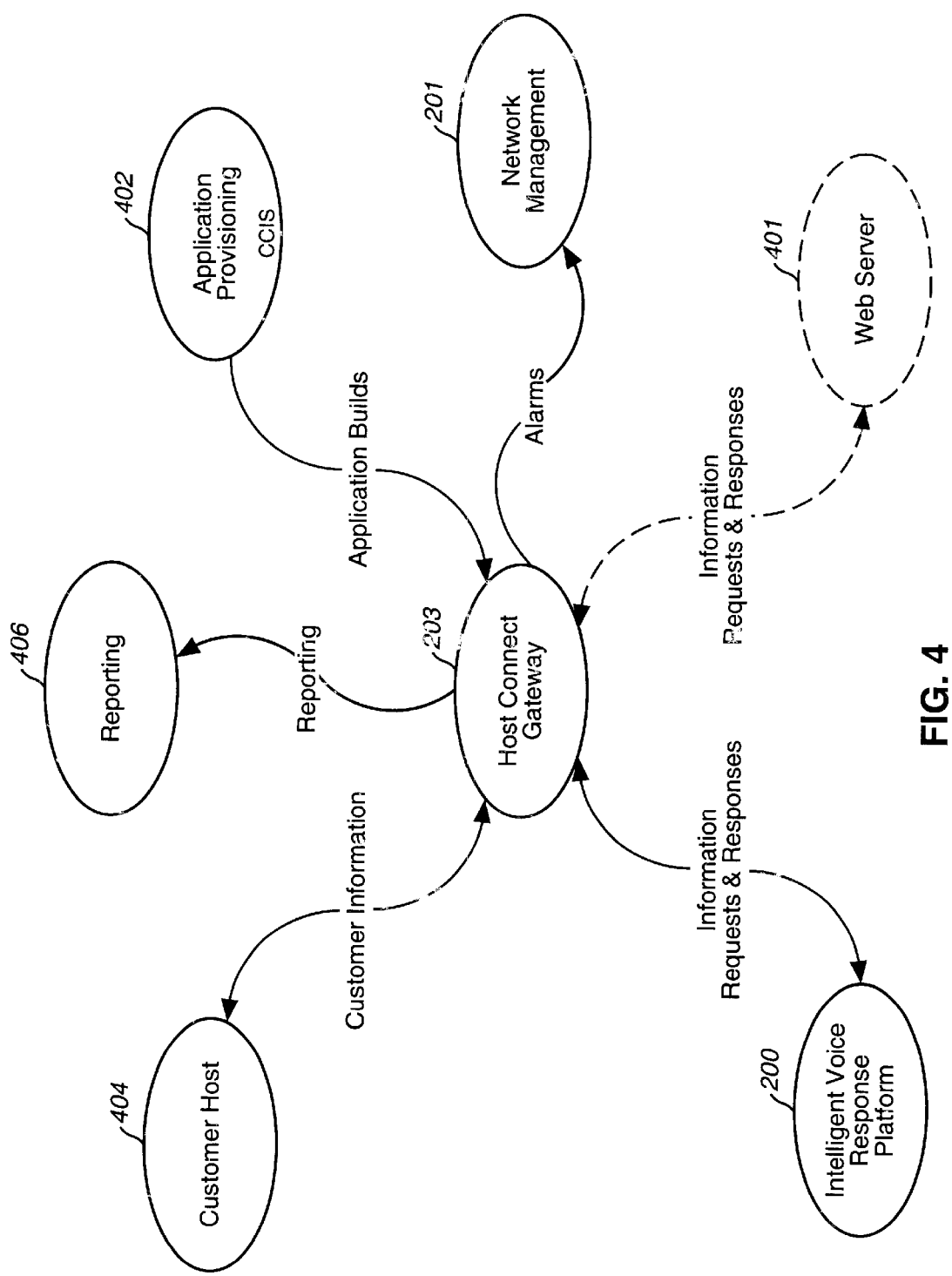
FIG. 4 illustrates the logical interfaces of an exemplary embodiment of the host connect gateway.

FIG. 4 illustrates the logical interfaces of the host connect gateway 203, according to an embodiment of the invention. The customer host connect gateway 203 receives information requests from the IVR platform 200 and returns responses. Responses are provided by interfaces with a customer host 404, such as the customer host computers 209 and 210 shown in FIG. 2. The interfaces to the customer host 404 and the IVR platform 200 represent the primary functions of the customer host connect gateway 203, according to an embodiment of the invention.

The customer host connect gateway 203 also provides a reporting function 406 as previously discussed. In the preferred embodiment, these reports are generated by the screen scraping application 204c. These reports may be sent to a printer, to a monitor, or to a file on the gateway server 204. In the prefered embodiment, the reports are sent to the database 212 on the application server 207 for subsequent retrieval by supervisory personnel.

The customer host connect gateway 203 also provides a reporting function 404, as previously discussed. In the preferred embodiment, these reports are generated by the screen scraping application 204c. These reports may be sent to a printer, to a monitor, or to a file on the gateway server 204. In the preferred embodiment, the reports are sent to the database 212 on the application server 207 for subsequent retrieval by supervisory personnel.

The customer host connect gateway 203 provides alarms to the network management system 201, as previously discussed. The application server 207 collects these alarms from each host connect gateway server 204. The remote network management system 201 may retrieve the alarm reports from the application server 207 over the EWAN 202.

The host connect gateway 203 may receive new applications from an application provisioning system 402, according to one embodiment of the invention. The application provisioning system 402 provides application build and configure management functions. The executable applications are provided to the customer host connect gateway 203. The application provisioning system 402 is a remote computing platform, according to a preferred embodiment of the invention. For example, the application provisioning system 402 may be a personal computer having Edify application building software that operates in conjunction with the Electronic Workforce product. Once programmers have built and tested a new application, the programmers may simply transfer the new application via the File Transfer Protocol (FTP) over an IP WAN to each host connect application server 204.

In an alternate embodiment, applications may be sent to the application server 207 at each customer host connect gateway 203. In yet another alternate embodiment, the applications may be built directly on the application server 207. However, a centralized application build and deployment system maintains higher data integrity, as previously discussed.

Figure 5:
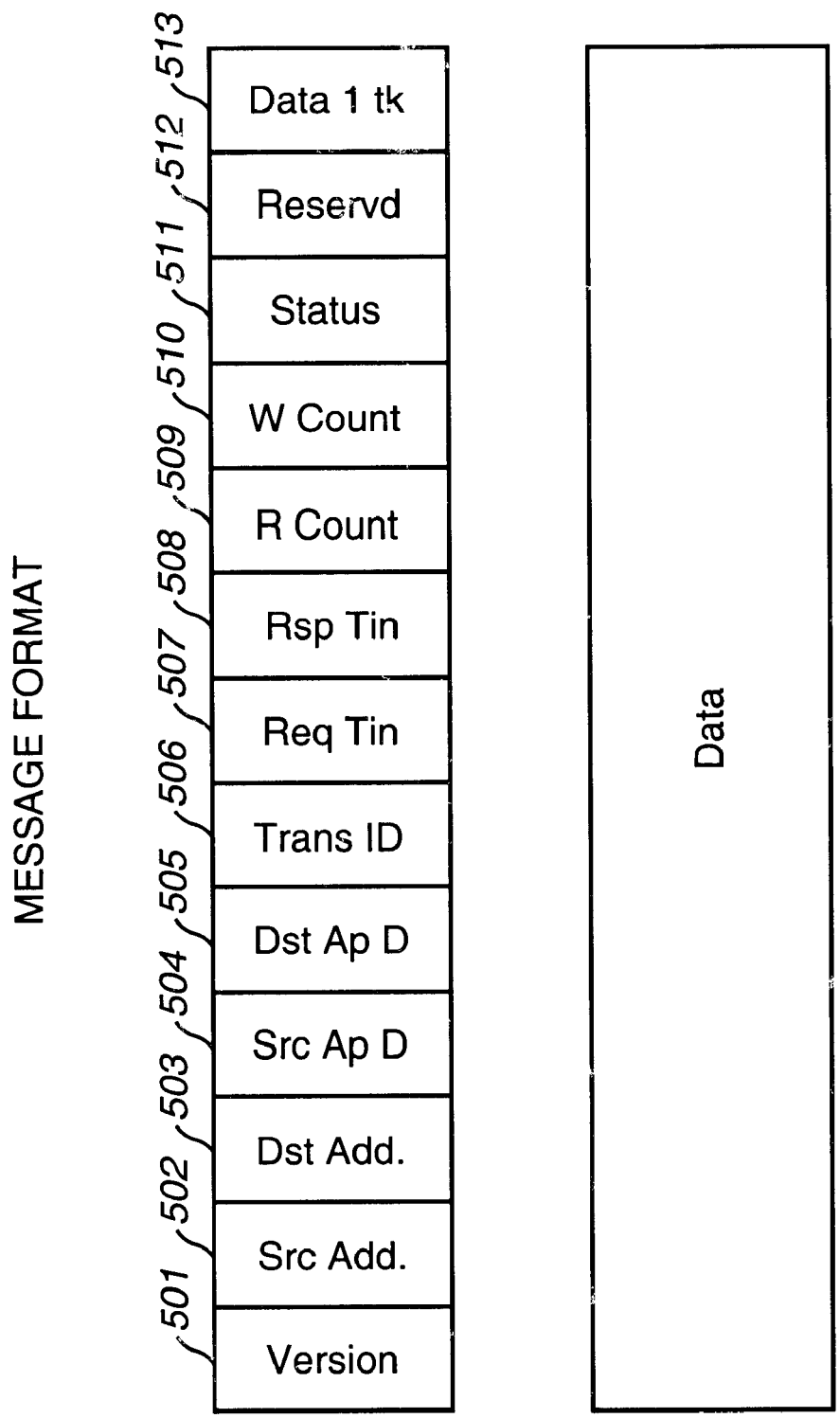
FIG. 5 depicts an exemplary format for a transaction message sent between an IVR platform and a customer host connect gateway.

FIG. 5 depicts an exemplary format for a transaction message sent between an IVR platform and a customer host connect gateway. As previously mentioned, transaction messages sent between an IVR platform, such as the IVR platform 200 shown in FIG. 2, and a customer host connect gateway, such as the customer host connect gateway 203 shown in FIG. 2, have a specific format that simplifies maintenance of the IVR platform and IVR application. The exemplary embodiment of a transaction message shown in FIG. 5 comprises 14 different fields.

A version field 501 identifies the specific version of the message format and is included to provide a method for conveying a change in the message format. A source address field 502 includes the IP address of the requester or client of the customer host connect gateway, such as the IVR platform 200. The customer host connect gateway 203 uses this address to identify the requester of a customer host connect gateway service. The format of the source address field 502 resembles a standard Internet address dot notation, such as 123.45.67.8, according to one embodiment of the invention.

A destination address field 503 includes the IP address of the destination customer host connect gateway, such as the customer host connect gateway 203 shown in FIG. 2, that acts as a provider or server for the customer host connect service. The destination address field 503 identifies the host connect entity providing the service. The format of the destination address field 503 also resembles a standard Internet address notation, according to one embodiment of the invention. A source application identifier field 504 includes an identifier that uniquely describes the source application, such as the IVR application 200*a* shown in FIG. 2. The source application identifier field 504 identifies both the IVR application and the caller presently using the application. For example, the source application identifier field 504 may include a caller ID and a circuit number that indicates where the call arrived.

A destination application identifier field 505 includes an identifier that uniquely identifies the destination application providing the host connect service, such as the host connect application 204*b* shown in FIG. 2. The destination application identifier field 505 comprises both a customer identifier and an application identifier that is associated with the customer identifier. A request time field 507 includes a time stamp that is generated when the customer host connect gateway receives the host connect request message. A response time field 508 includes a time stamp that is generated when the customer host connect gateway returns the host connect response message.

A read transaction field 509 includes the number of data transfers from a host, such as the customer host computer 209 shown in FIG. 2. A write transaction count field 510 includes the number of data transfers to host, such as the customer host computer 209 shown in FIG. 2. The transaction identifier field 506 includes an identifier that uniquely describes a specific request. The transaction identifier field 506 value is returned unmodified in the response message returned by the customer host computer. The transaction identifier field 506 value may be a message sequence number or any other value that is unique. A status field 511 is used to pass the status of a request message back to the customer host computer gateway application. A reserve field 512 is reserved for future enhancement to the system.

A data length field 513 includes the length of the data in the data field 514. If the length is less than four ASCII characters, the data length field 513 may be preceded by ASCII values for zero. The data field 514 includes the request for response data. This data may be either ASCII or non-ASCII data. The customer host connect gateway 203 may perform various validation procedures for each of the fields in messages received from the IVR platform, according to one embodiment of the invention.

FIGS. 6A, 6B and 6C illustrate an exemplary screen scraping process, such as that performed by the screen scraping application 204*c* shown in FIG. 2. As previously discussed, the screen scraping application 204 knows how to transmit data to a customer host computer application, such as the customer host computer application 209*a* shown in FIG. 2, and to retrieve data presented by the customer host computer application on an emulated terminal screen.

FIG. 6A shows an exemplary entry terminal screen for a tax reporting system 601. The screen scraping application provides data for a taxpayer identification 602 and a tax year 603 to the appropriate fields in the tax reporting system 601. The screen scraping application then emulates a carriage return, or "enter" function, or the appropriate operation to invoke processing by the tax reporting system 601.

The tax reporting system 601 then uses the taxpayer identification 602 and the tax year 603 to locate and retrieve the tax records for a particular taxpayer in a particular year. The reporting system 601 then presents a results terminal screen, such as the terminal screen shown in FIG. 6B. As shown in FIG. 6B, the specific taxpayer identified by the taxpayer identification 602 has a particular amount of tax due 604, has paid a specific amount of tax paid 605, and has a particular refund 606 due. As shown in FIG. 6B, the taxpayer's refund 606 is listed as a negative number because this particular taxpayer still owes the specified amount of taxes to the tax collection agency.

The screen scraping application may retrieve the fields 604, 605, and 606 and provide them to a remote application, such as the IVR application 200*a* shown in FIG. 2. The screen scraping application knows exactly where to locate the fields 604 605, and 606 on the emulated terminal screen and retrieve them.

Suppose the IVR application not only needs to retrieve fields 604, 605, and 606 but also needs to update these fields as well. As shown in FIG. 6C, the IVR application has provided update data to the screen scraping application regarding tax payments made by the taxpayer. The screen scraping application has submitted this update data to the tax system 601, and the terminal screen shown in FIG. 6C depicts the updated terminal screen. The tax due field 604, tax paid field 605, and refund field 606 now indicate that the taxpayer has settled his account with the tax collection agency for the tax year 603. Of course, the screen scraping application may also provide this update data to the remote application, such as the IVR application 200*a* shown in FIG. 2.

Figure 7:
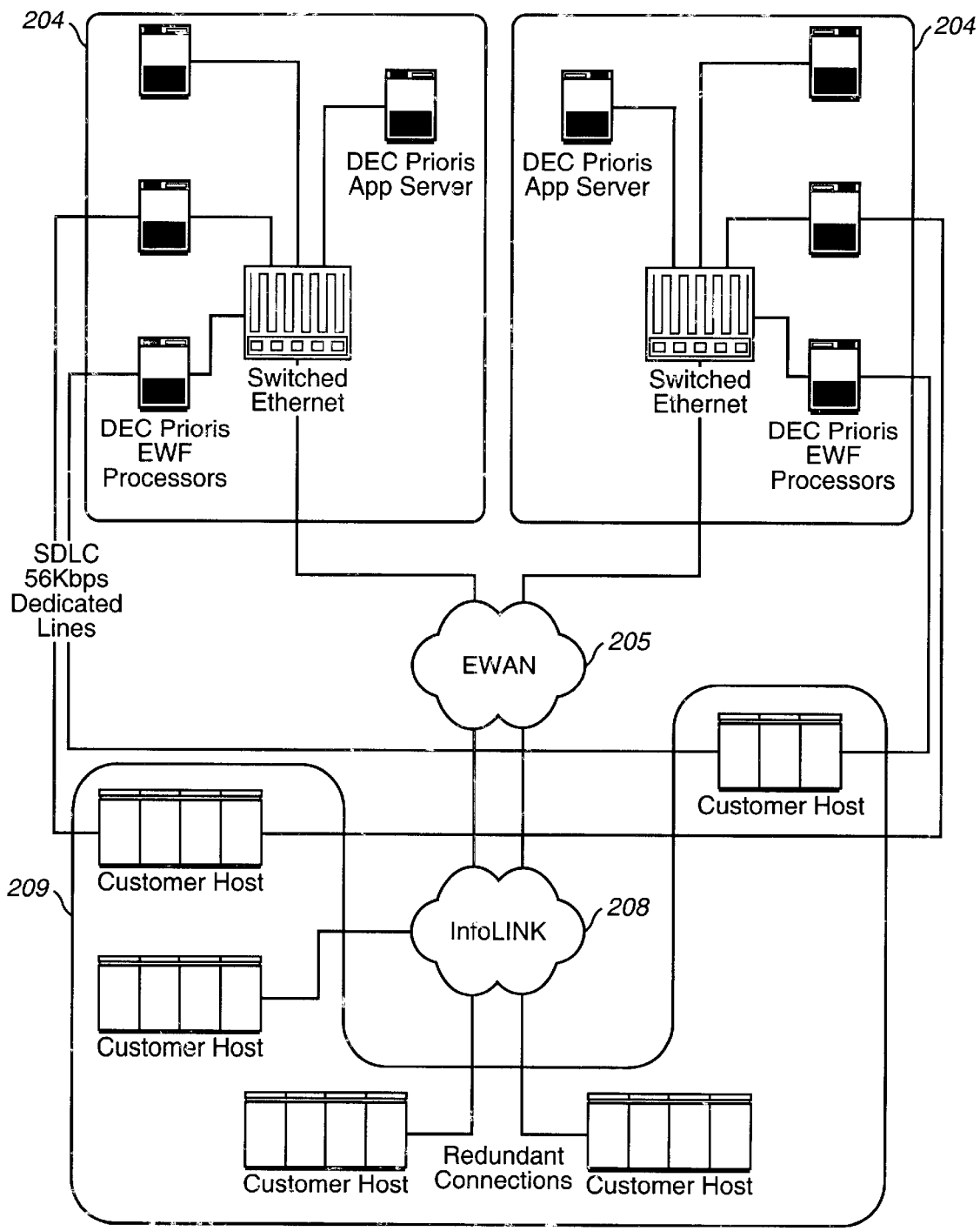
FIG. 7 illustrates an alternative embodiment for the connectivity between the customer host connect gateway servers and the customer host computers.

FIG. 7 provides an alternate embodiment of the connectivity between the customer host connect gateway servers and the customer host computers. In addition to connecting to the Infolink IP network 208, a customer host computing system, such as the customer host computer computing systems 209 shown in FIG. 2, may also have dedicated 56 Kbps lines directly to the host connect gateway server 204. This embodiment is useful for computing systems using the well known synchronous data link control (SDLC) protocol on a Systems Network Architecture (SNA) network, such as may be found in many IBM host computers.

Figure 8:
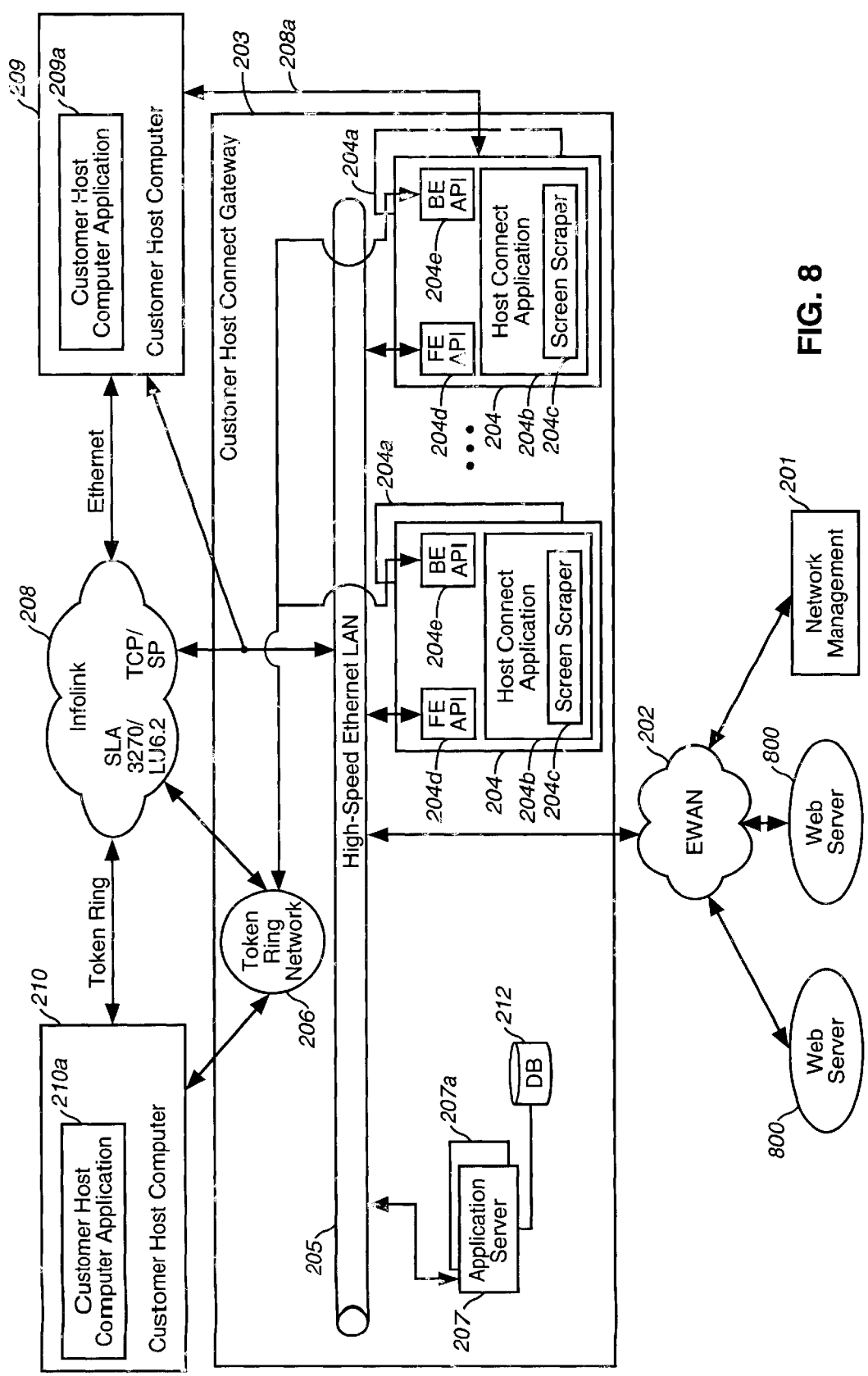
FIG. 8 illustrates an embodiment of the invention in which the customer host connect gateway provides a customer host interface for other network elements such as web servers.

As shown in FIG. 8, the customer host connect gateway provides a customer host interface for other network elements such as web servers, according to one embodiment of the invention. With the emergence of the Internet as a telephony network, many services previously offered on the public switched telephone network (PSTN) may now be offered on the Internet. Internet telephone services are typically provided by applications performed on web servers, such as a web server 800.

The web server 800 performs a role similar to that of an IVR platform, such as the IVR platform 200 shown in FIG. 2. Thus, the web server 800 may also need to perform transactions with a customer host computer, such as the customer host computer 209 shown in FIG. 2. The customer host connect gateway 203 provides an interface between web servers 800 and customer host computers 209 and 210. In all other aspects, the invention operates in the manner previously described. Of course, the customer host connect gateway may operate with both web servers and IVR platforms at the same time in the same call center installation.

Figure 9:
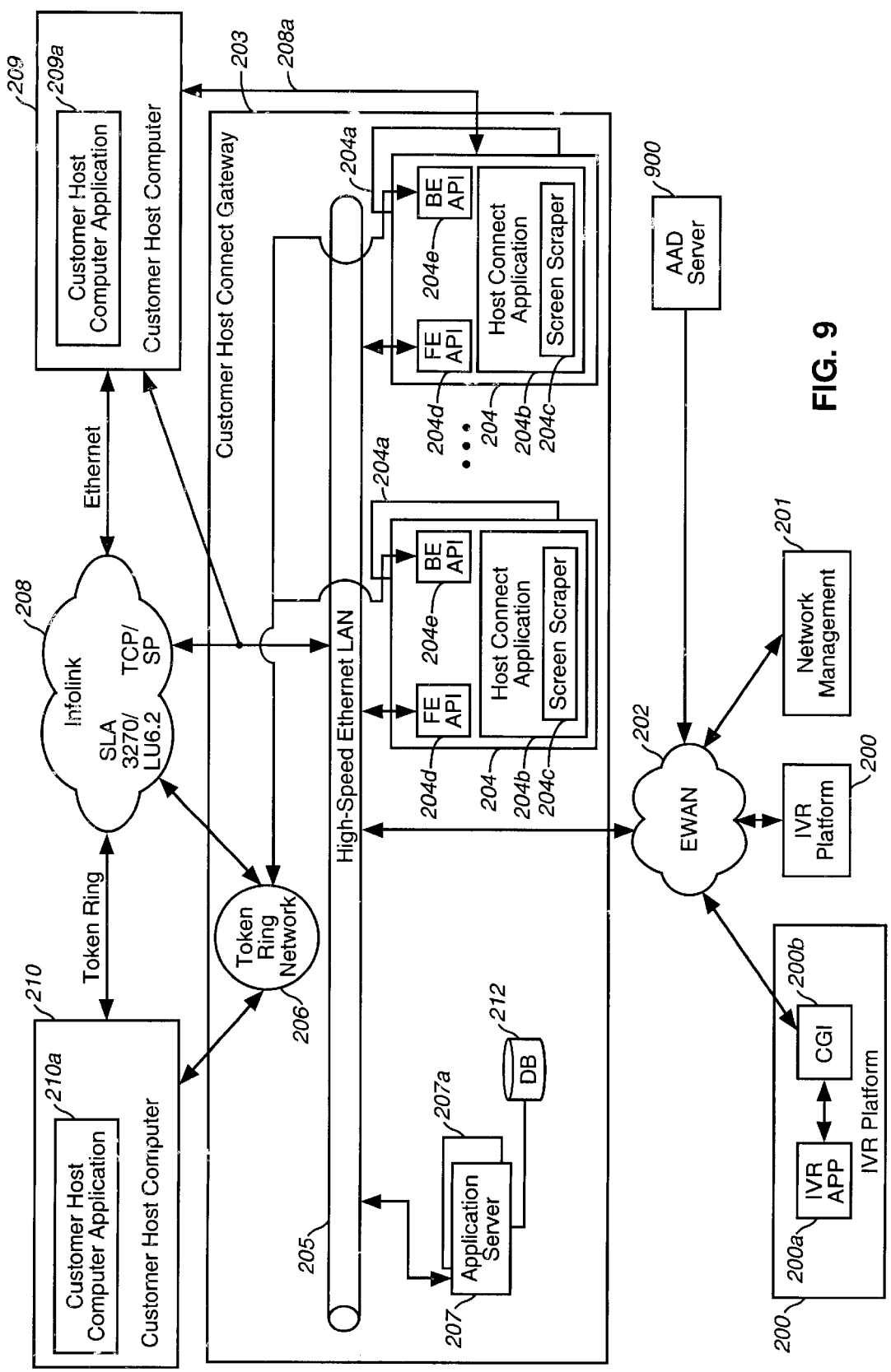
FIG. 9 illustrates an embodiment of the invention having an automated application deployment system that deploys new or modified customer applications without affecting system software, including the elements comprising the customer host connect gateway.

FIG. 9 illustrates an embodiment of the invention having an automated application deployment system that deploys a new or modified customer application without affecting system software including the elements comprising the customer host connect gateway. The automated application deployment system does not require interaction by an on-site operator during a customer application deployment. For example, application deployment may be initiated using a command on an application build platform. This allows the customer to introduce upgrades to customer computing systems without a necessity for interaction by the call center technical personnel. In this embodiment of the invention, application unique processing is moved from system software to application software packages.

In this embodiment of the invention, an automated application deployment (AAD) server 900, executes a script, such as a Perl script, that performs the automated updating and adding of new application programs, such as the host connect application 204b shown in FIG. 2. The AAD server 900 performs functions such as adding and removing packages from the customer host connect gateway, updating software versions, stopping and starting application networks, and executing installation scripts. The script, such as the Perl script, adds and deletes packages related to the customer host connect gateway and a the customer's host computer. The AAD server 900 may be implemented using a TCP/IP connection.

The application server 207 may also be used to build and deploy host gateway applications in an alternate embodiment of the invention. In this embodiment, the application server 207 is equipped with a graphical user interface (GUI). Using this GUI, the host gateway connect application may then be downloaded to each host connect gateway server.

In yet another embodiment of the invention, a host connect application resides on the application server, such as the application server 207 shown in FIG. 2, and be called by a host connect application server 204 when a transaction is received by an IVR application.

While the present invention has been described with reference to a preferred embodiment thereof, those skilled in the art will appreciate that various changes in form and detail may be made without departing from the intended scope of the present invention as defined in the appended claims. For example, the customer host connect gateways may differ from those shown in the figures. The actual connections between the components of the customer host connect gateway may differ from the functional description described above. Moreover, the customer host connect gateway and its constituent elements may even be comprised of microcode provided in various pieces of hardware equipment, provided that the collective operation of these elements operate in the manner that has been described. In addition, the customer host connect gateway may be run on different types of computing systems or on computing systems differing substantially from the computing network provided herein. The customer host connect gateway may be employed in other environments than a call center. In some configurations, the IVR platform and web server connected to a customer host connect gateway in communication with a customer host computer may itself comprise a complete installation.

Further aspects of the invention are described in the following copending patent applications, each of which are assigned to a common assignee: U.S. application Ser. No. 09/073,880, COS-97-040, Next Generation Service Node (NGSN) Internal Architecture, filed on May 7, 1998, U.S. application Ser. No. 09/074,096, COS-97-042, Call Center Network Architecture using the Next Generation Service Node (NGSN), filed on May 22, 1998, U.S. application Ser. No. 09/074,142, COS-97-043, Next Generation Service Node (NGSN) Resource Management, filed on May 7, 1998, U.S. application Ser. No. 09/074,072, COS-97-044, Signaling Gateway, filed on May 7, 1998, U.S. application Ser. No. 09/073,885, COS-97-045, Signaling Gateway TCL State Machine, filed on May 7, 1998, U.S. application Ser. No. 09/073,887, COS-97-046, Next Generation Service Node (NGSN) Service Execution Environment, filed on May 7, 1998, and U.S. application Ser. No. 08/934,167, COS-97-010, Network Park and Transfer, filed on Sep. 19, 1997. All of the above U.S. patents and applications are incorporated by reference.

Although specific embodiments of, and examples for, the invention are described herein for illustrative purposes, various equivalent modifications are possible within the scope of the invention, as will be recognized by those skilled in the relevant art. Additional embodiments of the invention and various equivalent modifications are possible within the scope of the invention and in combination with one or more of the applications listed above. The teachings provided herein of the invention can be applied to other customer host connect gateways, not necessarily the exemplary customer host connect gateway described above. Various exemplary computing systems, and accordingly, various other system configurations can be employed under the invention.

The embodiments of the invention disclosed herein have been discussed with regard to computerized network installations, such as those using large centralized computing systems. However, the invention finds equal applicability in other computing systems, such as small, portable computerized systems and even hand-held computing devices. The invention also finds applicability in other forms of telecommunications devices, such as a network of telecommunication devices that both send and receive electronic mail as well as voice and data communications.

These and other changes can be made to the invention in light of the above detailed description. In general, in the following claims, the terms used should not be construed to limit the invention to the specific embodiments disclosed in the specification and the claims, but should be construed to include all customer host connect gateway systems that operate under the claims. Accordingly, the invention is not limited by the disclosure, but instead its scope is to be determined entirely by the following claims.

What is claimed is:

1. A customer host gateway that interfaces between an interactive voice response platform that generates information requests and at least one customer host computer having a customer host computer application, comprising:

at least one host connect application server, including:
  a host connect application that receives information requests from the interactive voice response platform and translates the information requests into formatted messages acceptable by the at least one customer host computer and the customer host computer application, and
  a screen scraper application that receives the formatted messages, accesses the customer host computer application, and transmits the formatted messages to an appropriate location in a user interface of the customer host computer application; and
an application server that receives status messages from the at least one host connect application server.

2. The customer host gateway recited in claim 1, further comprising:
a common gateway interface process in communication with the interactive voice response platform that receives externally directed messages from the interactive voice response platform and formats the externally directed messages into information requests, wherein the information requests have a single format and the formatted messages prepared by the host connect application have more than one format.

3. The customer host gateway recited in claim 1, further comprising a database connected to the application server that stores the status messages received by the application server.

4. The customer host gateway recited in claim 1, further comprising a wide area network that provides communications between the customer host gateway and the interactive voice response platform.

5. The customer host gateway recited in claim 1, further comprising an Ethernet that provides communications between the at least one host connect application server and the application server.

6. The customer host gateway recited in claim 1, further comprising a token ring network that provides communications between the customer host connect gateway and the at least one customer host computer.

7. The customer host gateway recited in claim 1, further comprising a TCP/IP network connection that provides communications between the customer host connect gateway and the at least one customer host computer.

8. The customer host gateway recited in claim 1, further comprising an application preparation device that transmits new host connect applications to the customer host connect gateway.

9. The customer host gateway recited in claim 1, further comprising an application preparation device that transmits updates to host connect applications to the customer host connect gateway.

10. A customer host gateway that interfaces between a request-generating device that generates information requests and at least one customer host computer having a customer host computer application, comprising:
a front-end application programming interface that interfaces with the request-generating device and extracts information requests from messages sent by the request-generating device;
a back-end application programming interface that interfaces with the at least one customer host computer and formulates host messages for the at least one customer host computer from the extracted information requests; and
a host connect application that examines the extracted information requests to identify the at least one host computer to which each extracted information request has been directed.

11. The customer host gateway recited in claim 10, further comprising:
a host connect application server that includes the front-end application programming interface and the back-end application programming interface and further comprises:
a screen scraper application that receives the formulated host messages, accesses the at least one customer host computer application, and transmits the formatted messages to an appropriate location in a user interface of the at least one customer host computer application.

12. The customer host gateway recited in claim 10, further comprising:
a host connect application server that includes the front-end application programming interface and the back-end application programming interface and further comprises:
a database application that receives the formulated host messages, accesses the at least one customer host computer application, and uses the formulated host messages to perform database queries on the at least one customer host computer application.

13. The customer host gateway recited in claim 10 wherein the request-generating device is an interactive voice response platform, further comprising:
a common gateway interface process in communication with the interactive voice response platform that receives externally directed messages from the interactive voice response platform and formats the externally directed messages into information requests, wherein the information requests have a single format and the formulated host messages prepared by the back-end application programming interface have more than one format.

14. The customer host gateway recited in claim 10, further comprising a wide area network that provides communications between the customer host gateway and the request-generating device.

15. The customer host gateway recited in claim 10, further comprising a token ring network that provides communications between the customer host gateway and the customer host computer.

16. The customer host gateway recited in claim 10, further comprising a TCP/IP network connection that provides communications between the customer host gateway and the at least one customer host computer.

17. The customer host gateway recited in claim 10, further comprising an application preparation device that transmits a replacement back-end application programming interface to the customer host gateway that replaces the back-end application programming interface.

18. The customer host gateway recited in claim 17 wherein the application preparation device transmits a replacement front-end application programming interface to the customer host gateway that replaces the front-end application programming interface.

19. The customer host gateway recited in claim 10 wherein the request-generating device is an interactive voice response platform.

20. The customer host gateway recited in claim 10 wherein the request-generating device is a web server.

21. A host connect application server in a customer host gateway that interfaces between a request-generating device generating information requests and at least one customer host computer having a customer host computer application, comprising:
a host connect application that receives information requests from the request-generating device and translates the information requests into formatted messages acceptable by the at least one customer host computer and the customer host computer application;
a connection application that receives the formatted messages, accesses the customer host computer application, and transmits the formatted messages to an appropriate location in the customer host computer application;
a back-end application programming interface that translates information requests for the connection application into formatted messages acceptable by the at least one customer host computer and the customer host computer application using host-specific information provided by the host connect application; and a front-end application programming interface that formats reply messages from the customer host computer application into a format acceptable by the request-generating device using request-generating device information provided by the host connect application.

22. The host connect application server recited in claim 21 wherein the connection application is a screen scraper application that receives the formatted messages, accesses the customer host computer application, and transmits the formatted messages to an appropriate location in a user interface of the customer host computer application.

23. The host connect application server recited in claim 21 wherein the connection application is a database application that receives the formulated messages, accesses the customer host computer application, and uses the formulated messages to perform database queries on the customer host computer application.

24. The host connect application server recited in claim 21 wherein the connection application is a Systems Network Architecture (SNA) communications application that receives the formulated messages, accesses the customer host computer application, and communications the formulated messages to the customer host computer application using an SNA communications protocol.

25. The host connect application server recited in claim 21 wherein the host connect application prepares status messages for transmission to an application server having a system status database.

26. The host connect application server recited in claim 21 wherein the host connect application assures that reply messages directed towards the request-generating device are formatted for receipt by a common gateway interface process in communication with the request-generating device that receives messages directed for the request-generating device and extracts data from the received messages.

27. The host connect application server recited in claim 21 wherein communications between the host connect application server and the at least one host computer are formatted for transmission through an Ethernet communications device.

28. The host connect application server recited in claim 21 wherein communications between the host connect application server and the at least one host computer are formatted for transmission through a token ring network.

29. The host connect application server recited in claim 21 wherein information requests received from the request-generating device are formatted according to a TCP/IP communications protocol.

30. The host connect application server recited in claim 21, further comprising an application preparation device that transmits a replacement host connect application to the host connect application server that replaces the host connect application.

31. The host connect application server recited in claim 30 wherein the application preparation device transmits a replacement connection application to the customer host gateway server that replaces the connection application.

32. The host connect application server recited in claim 21 wherein the request-generating device is an interactive voice response platform.

33. The host connect application server recited in claim 21 wherein the request-generating device is a web server.

34. In a common gateway interface that receives information requests from a request-generating device and provides formatted information requests to a customer host connect gateway for processing by at least one customer host computer application, a computer-readable medium having a data structure, comprising:

a first field that identifies a host gateway application to process the formatted information request;

a second field that includes the Internet Protocol address of a host connect gateway server; and a third data field that includes the request to be processed by the at least one customer host computer application.

35. The computer-readable medium of claim 34, further comprising:

a fourth field that identifies a length of the third data field, and a fifth field that identifies the request-generating device.

36. The computer-readable medium of claim 34 wherein the data structure resides in microcode accessed by the common gateway interface.

37. In a customer host gateway that interfaces between a request-generating device that generates information requests and at least one customer host computer having a customer host computer application, a method for processing information between the request-generating device and the at least one customer host computer, comprising:

receiving an information request from the request-generating device;

identifying the at least one customer host computer to receive the information request;

translating the information request into a formatted message acceptable by the identified at least one customer host computer and the customer host computer applications; and sending the formatted message to the identified at least one customer host computer by a screen scraping application wherein said screen scraping application locates an appropriate terminal screen of said identified at least one customer host computer and deposits and retrieves requested information.

38. The method recited in claim 37, further comprising:

directing the identified at least one customer host computer to process the formatted message; and locating response information processed by the identified at least one customer host computer following processing of the formatted message.

39. The method recited in claim 38, further comprising:

formatting the response information into a format acceptable by the request-generating device; and transmitting the formatted response information to the request-generating device.

40. The method recited in claim 37, further comprising:

preparing status information regarding the processing of messages within the customer host connect gateway, and sending the status information to a status information database.

41. The method recited in claim 37, further comprising formatting messages to the request-generating device according to a format required by a common gateway interface associated with the request-generating device.

42. The method recited in claim 37, further comprising formatting messages sent to the request-generating device in a manner suitable for transmission across a wide area network that resides between the customer host connect gateway and the request-generating device.

43. The method recited in claim 37, further comprising preparing the formatted message in a manner suitable for transmission to the identified at least one customer host computer across an Ethernet local area network that provides communications between the identified at least one customer host computer and the customer host connect gateway.

44. The method recited in claim 37, further comprising preparing the formatted message in a manner suitable for transmission to the identified at least one customer host computer across a token ring network that provides communications between the identified at least one customer host computer and the customer host connect gateway.

45. The method recited in claim 37, further comprising formatting messages sent to the request-generating device in a manner suitable for a TCP/IP network connection that provides communications between the customer host connect gateway and the request-generating device.

46. The method recited in claim 37, further comprising receiving a new host connect application and replacing the host connect application with the new host connect application.

47. The method recited in claim 37 wherein the request-generating device is an interactive voice response platform.

48. The method recited in claim 37 wherein the request-generating device is a web server.

49. In a customer host gateway that interfaces between a request-generating device that generates information requests and at least one customer host computer having a customer host computer application, a computer-readable medium holding computer-executable instructions for performing a method for processing information between the request-generating device and the at least one customer host computer, comprising:

receiving an information request from the request-generating device;

identifying the at least one customer host computer to receive the information request;

translating the information request into a formatted message acceptable by the identified at least one customer host computer and the customer host computer application; and sending the formatted message to the identified at least one customer host computer by a screen scraping application wherein said screen scraping application locates an appropriate terminal screen of said identified at least one customer host computer and deposits and retrieves requested information.

50. The computer-readable medium recited in claim 49, further comprising:

directing the identified at least one customer host computer to process the formatted message; and locating response information processed by the identified at least one customer host computer following processing of the formatted message.

51. The computer-readable medium recited in claim 51, further comprising:

formatting the response information into a format acceptable by the request-generating device; and transmitting the formatted response information to the request-generating device.

52. The computer-readable medium recited in claim 49, further comprising:

preparing status information regarding the processing of messages within the customer host connect gateway; and sending the status information to a status information database.

53. The computer-readable medium recited in claim 49, further comprising formatting messages to the request-generating device according to a format required by a common gateway interface associated with the request-generating device.

54. The computer-readable medium recited in claim 49, further comprising formatting messages sent to the request-generating device in a manner suitable for transmission across a wide area network that resides between the customer host connect gateway and the request-generating device.

55. The computer-readable medium recited in claim 49, further comprising preparing the formatted message in a manner suitable for transmission to the identified at least one customer host computer across an Ethernet local area network that provides communications between the identified at least one customer host computer and the customer host connect gateway.

56. The computer-readable medium recited in claim 49, further comprising preparing the formatted message in a manner suitable for transmission to the identified at least one customer host computer across a token ring network that provides communications between the identified at least one customer host computer and the customer host connect gateway.

57. The computer-readable medium recited in claim 49, further comprising formatting messages sent to the request-generating device in a manner suitable for a TCP/IP network connection that provides communications between the customer host connect gateway and the request-generating device.

58. The computer-readable medium recited in claim 49, further comprising receiving a new host connect application and replacing the host connect application with the new host connect application.

59. The computer-readable medium recited in claim 49 wherein the request-generating device is an interactive voice response platform.

60. The computer-readable medium recited in claim 49 wherein the request-generating device is a web server.

* * * * *